United States Patent
Martens et al.

(10) Patent No.: US 9,873,551 B2
(45) Date of Patent: Jan. 23, 2018

(54) METHOD FOR PRODUCING A PARTLY TRANSPARENT BODY WITH A COLOR GRADIENT, AND A PARTLY TRANSPARENT BODY WITH A COLOR GRADIENT

(71) Applicant: Montblanc-Simplo GmbH, Hamburg (DE)

(72) Inventors: Manfred Martens, Hamburg (DE); Dietmar Podszuweit, Hamburg (DE)

(73) Assignee: Montblanc-Simplo GmbH (DE)

( * ) Notice: Subject to any disclaimer, the term of this patent is extended or adjusted under 35 U.S.C. 154(b) by 0 days.

(21) Appl. No.: 14/372,792

(22) PCT Filed: Jan. 17, 2013

(86) PCT No.: PCT/EP2013/050778
§ 371 (c)(1),
(2) Date: Jul. 17, 2014

(87) PCT Pub. No.: WO2013/107788
PCT Pub. Date: Jul. 25, 2013

(65) Prior Publication Data
US 2014/0353320 A1 Dec. 4, 2014

(30) Foreign Application Priority Data
Jan. 18, 2012 (DE) .......... 10 2012 000 851

(51) Int. Cl.
*B29C 65/02* (2006.01)
*B65D 25/54* (2006.01)
(Continued)

(52) U.S. Cl.
CPC .............. *B65D 25/54* (2013.01); *B29C 65/02* (2013.01); *B29C 66/126* (2013.01);
(Continued)

(58) Field of Classification Search
CPC ................. B29C 65/02; B44C 5/005
(Continued)

(56) References Cited

U.S. PATENT DOCUMENTS 2,350,421 A * 6/1944 Schoder .................. B29C 43/18
264/255
2,985,556 A * 5/1961 Rowland ............... B29C 47/043
156/100
(Continued)

FOREIGN PATENT DOCUMENTS

EP 1945440 A1 7/2008
FR 2306650 A1 11/1976
(Continued)

OTHER PUBLICATIONS

International Search Report for Application No. PCT/EP2013/050778 dated Jun. 3, 2013.

*Primary Examiner* — Scott W Dodds
(74) *Attorney, Agent, or Firm* — Lerner, David, Littenberg, Krumholz & Mentlik, LLP

(57) ABSTRACT

A method for producing a partly transparent body with a color gradient, include: providing a transparent first casing having a first joint surface on a protrusion and including an encased object; providing a second casing which is not completely transparent and which has a second joint surface in a recess. The shape of the protrusion and the shape of the recess correspond to each other; and combining the first casing and the second casing by inserting the protrusion into the recess and melting the first joint surface of the first casing with the second joint surface of the second casing. A pressure force and a temperature are applied to the first joint surface and the second joint surface such that the first joint surface of the first casing transitions into the second joint
(Continued)

surface of the second casing in a visually seamless manner, followed by a removal of material.

13 Claims, 2 Drawing Sheets

(51) Int. Cl.

| | |
|---|---|
| *B43K 8/00* | (2006.01) |
| *B43K 23/12* | (2006.01) |
| *B43K 29/00* | (2006.01) |
| *B43K 5/00* | (2006.01) |
| *B43K 7/00* | (2006.01) |
| *B32B 37/10* | (2006.01) |
| *B32B 37/14* | (2006.01) |
| *B29L 31/00* | (2006.01) |
| *B29C 65/00* | (2006.01) |
| *A44C 17/04* | (2006.01) |
| *A44C 27/00* | (2006.01) |

(52) U.S. Cl.
CPC .... *B29C 66/1248* (2013.01); *B29C 66/12443* (2013.01); *B29C 66/12463* (2013.01); *B29C 66/301* (2013.01); *B29C 66/305* (2013.01); *B29C 66/342* (2013.01); *B29C 66/7332* (2013.01); *B29C 66/73365* (2013.01); *B29C 66/746* (2013.01); *B29C 66/7444* (2013.01); *B29C 66/8322* (2013.01); *B32B 37/1018* (2013.01); *B32B 37/14* (2013.01); *B43K 5/005* (2013.01); *B43K 7/005* (2013.01); *B43K 8/003* (2013.01); *B43K 23/12* (2013.01); *B43K 29/00* (2013.01); *A44C 17/04* (2013.01); *A44C 27/00* (2013.01); *B29C 66/00145* (2013.01); *B29C 66/541* (2013.01); *B29C 66/71* (2013.01); *B29C 66/73161* (2013.01); *B29C 66/73366* (2013.01); *B29L 2031/725* (2013.01); *B29L 2031/739* (2013.01); *B29L 2031/743* (2013.01)

(58) Field of Classification Search
USPC ................ 156/309.6, 100; 264/245–248
See application file for complete search history.

(56) References Cited

U.S. PATENT DOCUMENTS

| | | | |
|---|---|---|---|
| 4,142,383 A | | 3/1979 | Eberhart |
| 4,767,647 A | * | 8/1988 | Bree ................ B05D 1/30 40/1.5 |
| 6,903,736 B1 | * | 6/2005 | Stefan ................ B44C 5/005 345/419 |
| 2005/0019088 A1 | | 1/2005 | Holland et al. |
| 2009/0249608 A1 | * | 10/2009 | Podszuweit ........... B29C 66/001 29/527.1 |
| 2011/0056243 A1 | | 3/2011 | Asscher et al. |

FOREIGN PATENT DOCUMENTS

| | | |
|---|---|---|
| WO | 03082042 A1 | 10/2003 |
| WO | 2007045316 A1 | 4/2007 |

* cited by examiner

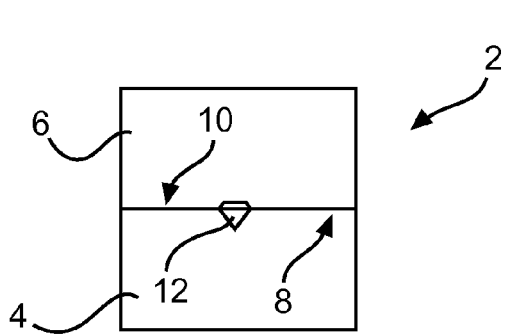
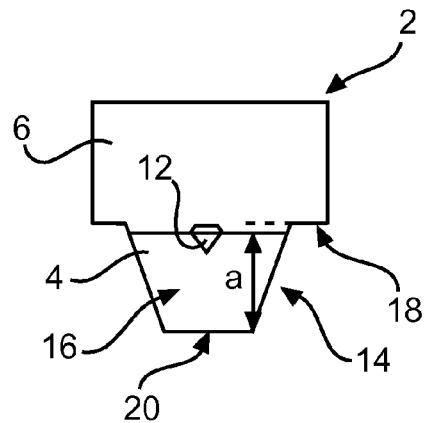
Fig. 1a          Fig. 1b
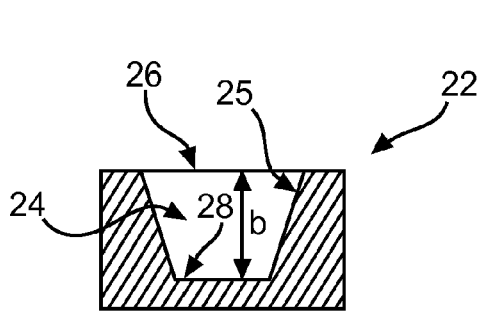
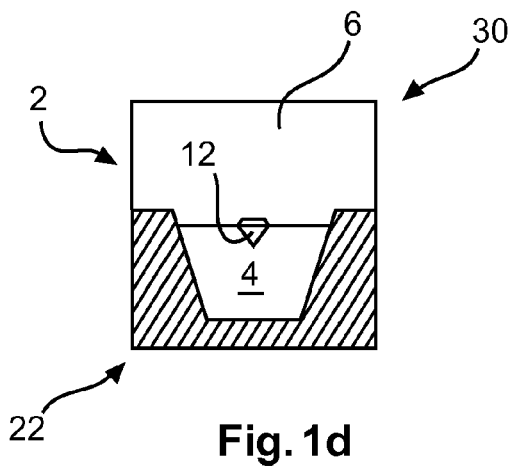
Fig. 1c          Fig. 1d
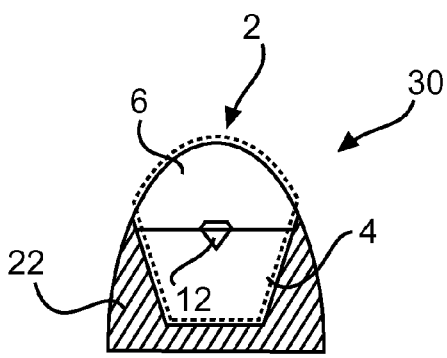
Fig. 1e

METHOD FOR PRODUCING A PARTLY TRANSPARENT BODY WITH A COLOR GRADIENT, AND A PARTLY TRANSPARENT BODY WITH A COLOR GRADIENT

CROSS REFERENCE TO RELATED APPLICATIONS

The present application is a national phase entry under 35 U.S.C. §371 of International Application No. PCT/EP2013/050778 filed on Jan. 17, 2013, published in German, which claims priority from German patent application number 10 2012 000 851.1 filed on Jan. 18, 2012, all of which are incorporated herein be reference.

TECHNICAL FIELD

The present invention relates to a method for producing a partly transparent body with a colour gradient and to a partly transparent body with a colour gradient.

BACKGROUND OF THE INVENTION

In the luxury goods sector, optical effects such as a magnifying effect or enlarging or diminishing effects are often used to optically embellish gemstones. Here, the fundamental principle is to insert and position an object into a transparent body or into a casing and to then provide the transparent casing with optical effects by shaping, for example by turning and/or polishing.

EP 1 945 440 B1 discloses a method for incorporating an object into a multipart, transparent casing, in which a first transparent casing having a first joint surface and a second transparent casing having a second joint surface are provided, the object to be encased is introduced between the accordingly filled casings and the casings are then melted or bonded together.

Furthermore, in order to achieve a particularly attractive visual effect, it is known to provide colour gradients or shading gradients on transparent bodies, which is frequently carried out by dipping the transparent body into a chemically active liquid, the resulting shading or shading gradient depending on the respective dipping time. This method is used, for example, in the case of sunglasses which have a shading gradient.

SUMMARY OF THE INVENTION

An object of the invention is to propose a method for producing a partly transparent body having an encased object, in which it is simultaneously possible to achieve a shading gradient.

The object is achieved by a method having the features of the independent claim 1. Advantageous embodiments and developments are set out in the subordinate claims.

In an advantageous embodiment, a first transparent casing is provided having an encased object and a first joint surface and a second casing is provided which is not completely transparent and has a second joint surface. The joint surface of the second casing is configured as an inner side of a recess, while the joint surface of the first casing is configured as the outer surface of a protrusion, the shape of the protrusion corresponding to the shape of the recess. The first joint surface is positioned on the second joint surface and then the first joint surface of the first casing is melted with the second joint surface of the second casing by applying a compressive force and a temperature to the first joint surface and to the second joint surface so that the first joint surface of the first casing merges into the second joint surface of the second casing in a visually seamless manner.

Due to the different degrees of transparency and to the melting of the first casing into the second casing, a seamless transition from a first casing to a second casing is obtained, so that a visually attractive colour gradient is achieved, subject to the selected shape of the recess. The term "colour gradient" also includes a shading gradient.

In a further advantageous embodiment of the method, before or during the melting of the casings, a vacuum is formed, as a result of which it is possible to prevent inclusions of air. A clear transition can be provided thereby, without the view of the encased object being spoiled by air bubbles, for example, between the first and second casings. Furthermore, the formation of a vacuum can reduce the necessary pressing force, since in this case it is not necessary to compress enclosed air cushions. Moreover, as a result, the tensions in the joining seam are also reduced, since there are no longer any pressurised inclusions of air.

In an advantageous embodiment of the method, the first casing and the second casing are arranged in a guide shaft. The guide shaft has a precisely defined clearance which is coordinated with the dimensions of the casings so that a body produced from the two casings can be fitted in a very precisely movable manner.

In a further advantageous embodiment of the method, at least one plunger element moves into the guide shaft to thereby apply a compressive force to the first casing and/or to the second casing. By means of the guide shaft and the plunger, it is thus possible to produce a defined compressive force which is oriented along the guide shaft to act on at least one of the two casings. It is thereby possible to avoid an undesirable oblique application of force.

In a further advantageous embodiment of the invention, the plunger element generates the compressive force parallel to a wall surface of the guide shaft. A displacement or tilt can be avoided thereby, so that undesirable transverse forces do not arise.

In an advantageous embodiment, the recess is configured such that it tapers towards a base surface, as a result of which the wall thickness of the not completely transparent casing which encloses the protrusion of the first casing increases in a running direction starting from the first casing. As a result, increasing shading or darkening occurs.

In an advantageous embodiment, the inner surface of the recess has a constant incline. The funnel shape resulting therefrom can be easily produced and can create an increasing colour shading towards the base surface.

As a result thereof, in an advantageous embodiment, the protrusion is configured as a truncated cone. Here, it must be ensured that the depth of the inner contour as far as the planar base surface is less than the length of the truncated cone arranged on the first casing to avoid the inclusion of air when the two casings are joined together. This measure prevents the creation of a positive connection when the truncated cone is inserted into the conical recess, which positive connection would include air between the base surface and the truncated cone which would remain there during the melting procedure. It must also be ensured for all other possible forms of the protrusion that a gap is left when the protrusion is introduced into the recess.

In an equally advantageous embodiment, the recess can have a changing incline. In this respect, the recess can follow a mathematical function, for example a parabola or a hyperbola, and it could also follow single graded first order functions. The change in incline can be variable, but undercuts should not be made in order to avoid inclusions of air. The contour of the inner surface could be adapted to the resulting external contour of the object, for example, to produce a linear colour gradient.

In an advantageous embodiment, the incline changes monotonically or strictly monotonically in one direction, thereby producing a uniform colour gradient.

Furthermore, in an advantageous embodiment, the base surface of the recess is planar to create a clear termination in the recess and to allow an effective joining ability with the first casing.

In an advantageous embodiment, a first casing is formed by a first casing portion having a first casing portion joint surface and by a second casing portion having a second casing portion joint surface. An object is arranged on or in the region of the first casing portion joint surface. The first casing portion and the second casing portion are then brought together so that the object remains or is even temporarily clamped between the first casing portion joint surface and the second casing portion joint surface. If the object is arranged in a defined position on the first casing portion joint surface, when the first casing portion and the second casing portion are brought together, the object remains in this defined position. The first joint surface of the first casing portion is then melted with the second joint surface of the second casing portion by applying a compressive force and a temperature to the first casing portion joint surface and to the second casing portion joint surface so that the first joint surface of the first casing merges into the second joint surface of the second casing in a visually seamless manner. The additional features of this embodiment are shown very clearly in EP 1 945 440 B1. The method according to the invention can advantageously develop a transparent body, prepared in this manner and having an enclosed object, by the previously described features.

The object encased in the first casing is preferably positioned in the first casing in such a manner or the second casing is preferably configured such that the object is fully encased by the second casing. This particularly advantageous method can provide an outstanding visual effect. If the body is viewed from the first casing, the encased object appears to be in a dark fog which clears towards the encased object and completely disperses towards the upper side of the object, but becomes thicker starting from the first casing and finally ends in a generally non-transparent surface.

In an advantageous embodiment, the second casing is configured to be completely non-transparent. This measure can further reinforce the fog effect. By way of example, the second casing can be completely black.

In an advantageous embodiment, an optical effect can be achieved by machining, in particular by turning and/or polishing a first casing surface of the first casing and/or a second casing surface of the second casing. These casing surfaces are understood as meaning the outer surface or the outside of the respective casing. The production of curved surfaces of the transparent casings can provide any desired optical effects which are very attractive to the consumer. An enlarging effect can make a gemstone, for example, encased in the first casing look expensive or larger. Accordingly, diminishing or distortion effects are also possible.

In an advantageous embodiment, after the first and second casings have been joined together, material is removed from the outer surface of the body to produce a seamless surface. The resulting shape of the body could be approximately conical, one part of the cone being responsible for achieving the colour gradient or shading gradient and another part supporting the encased object. After final processing, a seam is no longer visible, so that the two casings also form a unit visually.

In an advantageous embodiment of the invention, the second casing is produced by an injection moulding method. Injection moulding is particularly suitable for producing a casing when plastics materials or transparent plastics materials are used.

In a further advantageous embodiment, at least one of the joint surfaces of the two casings is diamond-polished so that the diamond-polished joint surface has a smooth surface. In the present context, "diamond-polishing" means producing a smooth surface by means of diamond turning tools, for example. This produces an extremely smooth surface structure, comparable with a surface polished without any grooves. A clear, invisible joining seam can be produced with this smooth surface.

Insofar as the term "smooth" is used in the present context, this means that a roughness of less than $R_Z=1$ μm is provided. However, in order not to allow the joining seam to be outwardly visible, the transparency of the surface is at least as important as the smooth condition thereof. Thus, the surface should have a high gloss and should not be matt.

In a further advantageous embodiment, at least one of the joint surfaces of the two casings is machined such that a high-gloss, mirror-like, highly transparent surface is produced. With this surface, a joining seam can be produced which does not generate any reflections of any roughness which may be present, and which is thus invisible.

In a further advantageous embodiment, one of the two casings can have an edge which is peripheral at least in portions, and the other casing has an elevation. The two casings can then be brought together such that the edge engages positively with the elevation. The first casing and the second casing are thereby connected positively and in a stabilised manner. In the subsequent joining procedure or during the melting procedure, the object can be held more effectively in its oriented position.

In a further exemplary embodiment, at least the edge of the first casing or of the second casing and/or the elevation of the first casing or of the second casing can be configured conically. A press fit or a positive locking can be formed thereby which allows the two first and second casings to remain in the joined position and thereby allows easier handling of the casings and a more accurate positioning.

In a further advantageous embodiment, the edge of the first or second casing has openings to allow air to escape. Thus, during the pressing procedure, air contained inside the casings can escape so that air bubbles cannot develop during the melting procedure and thus a clear, transparent material quality can be formed.

In an advantageous embodiment of the method, during the melting step, the first and second casings are heated such that they become doughy. "Doughy" is understood as meaning the most viscous transition region between the solid and liquid aggregate state of a medium. With the method according to the invention, it is not absolutely necessary to produce a melted state in which the masses to be joined together have to become liquid. Since the guide shaft is coordinated very precisely with the dimensions of the two casings, and thus the material cannot escape or flow away, by applying pressure and temperature it is possible to produce a doughy state in which the two casings can be melted together.

In a further advantageous embodiment, a fastening element for fastening to a holder element is formed on the second casing. The holder element can be selected from the group consisting of fountain pens, pens, watches and jewelry.

In an advantageous embodiment of the method, a temperature of 120° C. to 160° C., preferably approximately 140° C. is selected during the melting procedure. The temperature should be maintained for a period of 1 to 5 seconds, preferably 3 seconds. The plunger elements act on the casings to be joined together within a pressure range of 180 to 260 bars, preferably approximately 230 bars. During cooling at approximately 90° C., the pressure is maintained until the material of the casings has become solid. The pressure which prevails during the joining procedure until the melting temperature has been reached can be 60 to 80 bars, preferably approximately 70 bars. Plastics material, such as PMMA with different compositions, is preferably used for the casings. Of course, when different materials are used, different temperature ranges, pressure ranges or time periods can be advantageous.

It should be noted that a first casing can also be melted with a second casing which is to consist of a first casing portion and of a second casing portion, such that all three parts are melted at the same time.

The invention also relates to a body which is produced by the aforementioned method and on which the aforementioned advantageous features are configured.

BRIEF DESCRIPTION OF THE DRAWINGS

Further features, advantages and possible uses of the invention are set out in the following description of the embodiments and in the figures. In this respect, all the described and/or illustrated features form, per se and in any combination, the subject-matter of the invention, also irrespective of their composition in the individual claims or of the back-references thereof. Furthermore, in the figures the same reference numerals represent the same or similar objects.

FIG. 1a to 1e show the procedure for the production of a body.

DETAILED DESCRIPTION OF EXEMPLARY EMBODIMENTS

Figure 2:
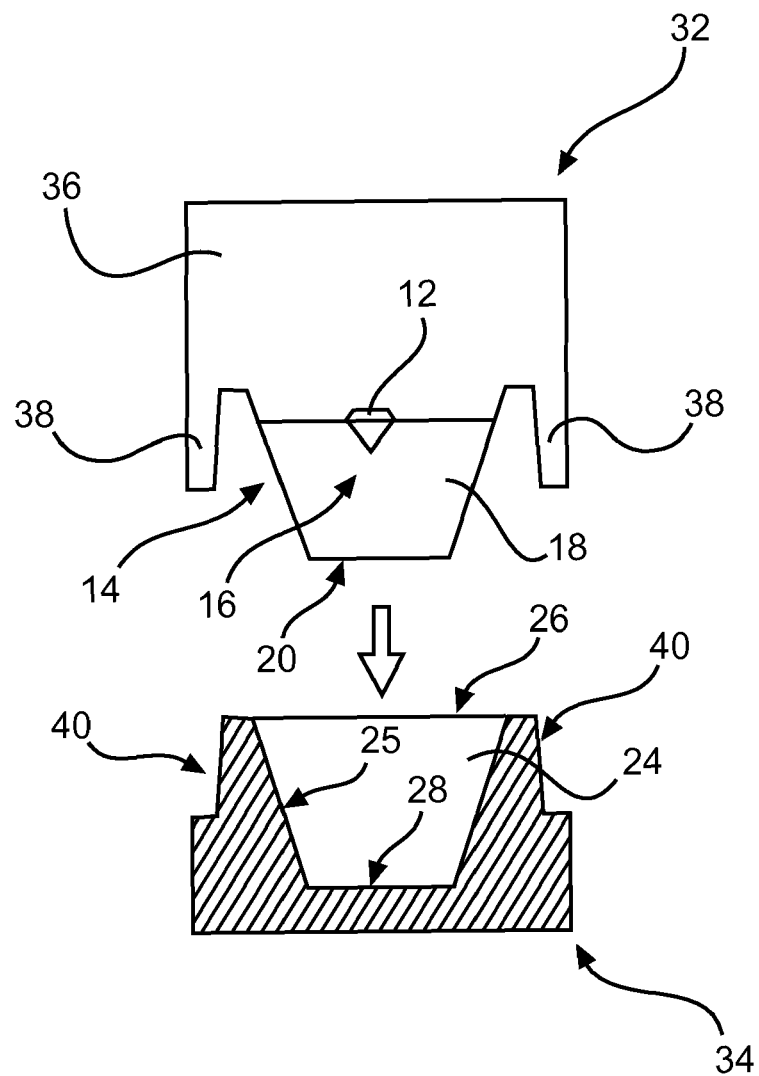
FIG. 2 shows a variant with a clamping edge.

FIG. 1a shows the blank shape of the first casing 2 which consists, for example, of a first casing portion 4 and of a second casing portion 6 which have a first casing portion joint surface 8 and a second casing portion joint surface 10 which are melted together with the inclusion of an object 12. A body of this type in the form of the first casing 2 is made for example by a method described in EP 1 945 440 B1. The first casing 2 does not necessarily have to be configured as in FIG. 1. The method according to the invention can also be implemented with any other first casings which enclose an object.

FIG. 1b shows how the first casing 2 can be prepared in order to produce an attractive visual colour gradient or shading gradient. For example, one side of the first casing 2 is formed into a truncated cone-shaped protrusion 14 by a material-removing machining procedure, the lateral surface 16 of the truncated cone being considered as the first joint surface. To achieve a particularly effective joining ability, the first joint surface 16 can be polished or diamond-polished. In FIG. 1b, the height of the truncated cone is identified by "a" which is the distance between a radially projecting edge 18 and an end face 20 which is planar in the example. The first casing prepared thus is configured to be rotationally symmetrical.

FIG. 1c shows a second casing 22 which is configured not to be completely transparent. The second casing 22 can preferably be completely coloured, for example in black. To receive the first casing 2, a recess 24 with an opening surface 26 and a base surface 28, planar in the example, is formed, the shape of which is formed to correspond to the protrusion 14. Accordingly, the recess has an inner surface 25 which can have a linear, unchanging incline, but can also have a changing incline. In FIG. 1c, the height of this recess is identified by "b", and the distance "b" should be shorter than the distance "a" of the first casing 2. This measure can prevent air from being included when the first and second casings are joined together.

FIG. 1d shows the resulting body 30 consisting of the first casing 2 and of the second casing 22 which are inserted one inside the other. The two casings are joined together under the effect of pressure and temperature and they form an integral, seamless body 30.

It can be seen from the example of the first casing 2 with the encased object 12 that the second casing 22 completely surrounds the encased object 12. The height of the opening surface 26 of the second casing 22 is the same as the height of the encased object 12 or is slightly greater.

To produce the final form which allows the integration of the body 30 into a writing implement for example, the outer surface of the body has to be machined. FIG. 1e shows, for example, a finished, conically shaped body 30 which can be arranged on the rear end of a pen housing or of a pen cap. For example, the body 30 from FIG. 1d could be turned on a lathe and then polished or diamond-polished to produce an attractive outer appearance. If the object 12 is observed from above the first casing 2, it now appears to be in a fog which disperses towards the tip of the encased object 12 and becomes thicker downwards towards the base surface 28 of the recess 24. In addition to this, a fastening element can be arranged or shaped on the lower side of the body 30 so that the body can be attached (not shown).

FIG. 2 shows a first casing 32 which has a first casing portion 4 as in FIG. 1b and a modified second casing portion 36 which is provided with an extended edge 38 which runs over the first casing portion 4. This edge 38 can be introduced into a corresponding peripherally arranged recess 40 in a first casing 34 to centre the two casings 32 and 34 relative to one another. To avoid the inclusion of air, the edge can be provided with recesses or openings which allow air to escape.

In addition, it is pointed out that the term "having" does not exclude any other elements or steps and "a" or "one" does not exclude a plurality. It is also pointed out that features which have been described with reference to one of the above embodiments can also be used combined with other features of other embodiments described above. Reference numerals in the claims should not be construed as limiting the scope of the claims.

The invention claimed is:

1. A method for producing a partly transparent body with a colour gradient, comprising:
   providing a first transparent and rotationally symmetrical casing having a first joint surface on a truncated cone-shaped protrusion and having an encased object;
   providing a second casing which is not completely transparent and which has a second joint surface in a truncated cone-shaped recess, the shape of the protrusion and the shape of the recess corresponding to one another such that the second casing completely surrounds the encased object and such that the height of an opening surface in the second casing is at least the same as the height of the encased object;

combining the first casing and the second casing by inserting the protrusion into the recess; and melting the first joint surface of the first casing with the second joint surface of the second casing by applying a compressive force and a temperature to the first joint surface and to the second joint surface so that the first joint surface of the first casing merges into the second joint surface of the second casing in a visually seamless manner.

2. The method according to claim 1, further comprising forming a vacuum before the melting procedure, thereby preventing the inclusion of air between the first casing and the second casing.

3. The method according to claim 1, wherein the first casing and the second casing are arranged in a guide shaft.

4. The method according to claim 3, wherein at least one plunger element moves into the guide shaft to thereby apply a compressive force onto at least one of the first casing and the second casing.

5. The method according to claim 4, wherein the plunger element creates the compressive force parallel to a wall surface of the guide shaft.

6. The method according to claim 1, wherein the recess is configured to taper from the opening surface to a base surface.

7. The method according to claim 6, wherein the inner surface of the recess has a constant incline.

8. The method according to claim 1, wherein the inner surface of the recess has a changing incline.

9. The method according to claim 8, wherein the incline changes monotonically or strictly monotonically in one direction.

10. The method according to claim 1, wherein the recess has a planar base surface.

11. The method according to claim 1, wherein the first casing is formed by a first casing portion having a first casing portion joint surface and by a second casing portion having a second casing portion joint surface, the method further comprising:

arranging an object on or in the region of the first casing portion joint surface;

bringing together the first casing portion and the second casing portion so that the object remains or is temporarily clamped between the first casing portion joint surface and the second casing portion joint surface;

melting the first casing portion joint surface with the second casing portion joint surface by applying a compressive force and a temperature to the casing portion joint surfaces so that the first joint surface of the first casing portion merges into the second joint surface of the second casing portion in a visually seamless manner.

12. The method according to claim 1, wherein the second casing is configured to be completely non-transparent.

13. The method according to claim 1, further comprising removing material from the outer surface of the body to produce a seamless surface.

* * * * *